United States Patent
Qian

(10) Patent No.: US 11,501,078 B2
(45) Date of Patent: Nov. 15, 2022

(54) METHOD AND DEVICE FOR PERFORMING REINFORCEMENT LEARNING ON NATURAL LANGUAGE PROCESSING MODEL AND STORAGE MEDIUM

(71) Applicant: Beijing Xiaomi Intelligent Technology Co., Ltd., Beijing (CN)

(72) Inventor: Zhuang Qian, Beijing (CN)

(73) Assignee: Beijing Xiaomi Intelligent Technology Co., Ltd., Beijing (CN)

(*) Notice: Subject to any disclaimer, the term of this patent is extended or adjusted under 35 U.S.C. 154(b) by 486 days.

(21) Appl. No.: 16/693,689

(22) Filed: Nov. 25, 2019

(65) Prior Publication Data

US 2021/0034966 A1 Feb. 4, 2021

(30) Foreign Application Priority Data

Jul. 29, 2019 (CN) .......................... 201910687763.0

(51) Int. Cl.
*G06F 40/30* (2020.01)
*G06N 3/08* (2006.01)

(52) U.S. Cl.
CPC .................................. *G06F 40/30* (2020.01)

(58) Field of Classification Search
CPC .............................. G06F 40/295; G06N 3/08
See application file for complete search history.

(56) References Cited

U.S. PATENT DOCUMENTS

| | | | |
|---|---|---|---|
| 10,431,219 B2 | 10/2019 | Danila et al. | |
| 2015/0066479 A1 | 3/2015 | Pasupalak et al. | |
| 2017/0140755 A1 | 5/2017 | Andreas et al. | |
| 2017/0228367 A1 | 8/2017 | Pasupalak et al. | |
| 2017/0372199 A1 | 12/2017 | Hakkani-Tur et al. | |
| 2018/0174585 A1 | 6/2018 | Andreas et al. | |
| 2018/0232435 A1 | 8/2018 | Papangelis et al. | |
| 2018/0233143 A1 | 8/2018 | Papangelis et al. | |
| 2018/0260384 A1 | 9/2018 | Pasupalak et al. | |
| 2018/0275817 A1 | 9/2018 | Hou et al. | |

(Continued)

FOREIGN PATENT DOCUMENTS

| | | |
|---|---|---|
| CN | 106445147 A | 2/2017 |
| CN | 106569998 A | 4/2017 |

(Continued)

OTHER PUBLICATIONS

Panchendrarajan, Rrubaa, and Aravindh Amaresan. "Bidirectional LSTM-CRF for named entity recognition." Proceedings of the 32nd Pacific Asia Conference on Language, Information and Computation. 2018. (Year: 2018).*

(Continued)

*Primary Examiner* — Jialong He

(74) *Attorney, Agent, or Firm* — Finnegan, Henderson, Farabow, Garrett & Dunner, L.L.P.

(57) ABSTRACT

A method for natural language, includes: determining a slot tagging result output by a Bi-directional Long Short-Term Memory-Conditional Random Field algorithm (BiLSTM-CRF) model after slot tagging on conversation data input by a user; determining reward information based on the slot tagging result and a reward of the user for the slot tagging result; and performing reinforcement learning on the BiLSTM-CRF model according to the reward information.

9 Claims, 5 Drawing Sheets

(56) References Cited

U.S. PATENT DOCUMENTS

| | | | |
|---|---|---|---|
| 2018/0307765 A1* | 10/2018 | Iwata | G06F 16/248 |
| 2019/0103101 A1 | 4/2019 | Danila et al. | |
| 2019/0015621 A1 | 5/2019 | He et al. | |
| 2019/0139537 A1* | 5/2019 | Akamine | G10L 15/1815 |
| 2019/0037851 A1 | 12/2019 | Danila et al. | |
| 2020/0012721 A1 | 1/2020 | Pasupalak et al. | |
| 2020/0050940 A1 | 2/2020 | Li et al. | |
| 2020/0293874 A1* | 9/2020 | Ji | G06N 3/08 |

FOREIGN PATENT DOCUMENTS

| | | |
|---|---|---|
| CN | 106919702 A | 7/2017 |
| CN | 106933809 A | 7/2017 |
| CN | 108108449 A | 6/2018 |
| CN | 108363690 A | 8/2018 |
| CN | 109003605 A | 12/2018 |
| CN | 109063035 A | 12/2018 |
| CN | 109697679 A | 4/2019 |
| CN | 109918680 A | 6/2019 |
| JP | 2018132754 A | 8/2018 |
| JP | 2018163641 A | 10/2018 |
| KR | 20080066946 A | 7/2008 |
| RU | 2494476 C2 | 9/2013 |
| RU | 2595489 C2 | 8/2016 |
| RU | 2665239 C2 | 8/2018 |
| WO | WO 2017/186050 A1 | 11/2017 |
| WO | WO 2019/070684 A1 | 4/2019 |
| WO | WO 201908481 | 5/2019 |

OTHER PUBLICATIONS

"Reinforcement Learning", Wikipedia, https://en.wikipedia.org/wiki/Reinforcement_learning; retrieved from www.archive.org, archived on Dec. 31, 2018. (Year: 2018).*

International Search Report in International Application No. PCT/CN2019/110894, dated Apr. 27, 2020.

Zhiheng Huang et al., Bidirectional LSTM-CRF Models for Sequence Tagging, published on Aug. 9, 2015 (https://arxiv.org/abs/1508.01991), 10 pages.

Yu Wang et al., A New Concept of Deep Reinforcement Learning based Augmented General Sequence Tagging System, Proceedings of the 27th International Conference on Computational Linguistics, Dec. 26, 2018 (Dec. 26, 2018), pp. 1683-1693, XP055701702, Retrieved from the Internet: URL: https://www.aclweb.org/anthology/C18-1143. pdf [retrieved on Jun. 5, 2020].

Supplementary European Search Report in European Application No. 19212600.1, dated Jun. 16, 2020.

Notice of Allowance of Russian Application No. 2019141376, dated May 27, 2020.

First Office Action of the Korean Application No. 10-2019-7035003, dated Feb. 10, 2021.

First Office Action of Chinese Application No. 201910687763.0, dated Jul. 2, 2021.

Notice of Reasons for Refusal of Japanese Application No. 2019-564011, dated Nov. 16, 2021.

* cited by examiner

METHOD AND DEVICE FOR PERFORMING REINFORCEMENT LEARNING ON NATURAL LANGUAGE PROCESSING MODEL AND STORAGE MEDIUM

CROSS-REFERENCE TO RELATED APPLICATIONS

This application is based upon and claims priority of Chinese Patent Application No. 201910687763.0, filed on Jul. 29, 2019, the entire contents of which are incorporated herein by reference.

TECHNICAL FIELD

The present disclosure relates generally to the technical field of man-machine conversation, and more particularly, to a method and device for natural language processing and a storage medium.

BACKGROUND

Natural language processing is a science integrating linguistics, computer science and mathematics, and is a theory and method for researching and implementing effective human-computer communication with a natural language. During natural language processing, a sequence labeling model is a commonly used model, and is applied widely to the related fields of text processing and the like.

At present, popular methods for solving sequence labeling problems include a Hidden Markov Model (HMM), Conditional Random Fields (CRFs), and Recurrent Neural Networks (RNNs). However, all the above-mentioned models may have the problems of limited model capability, incapability in self-learning and the like.

SUMMARY

According to a first aspect of the embodiments of the present disclosure, a method for natural language processing is provided, which may be applied to a chatbot in a man-machine conversation device and include: determining a slot tagging result output by a Bidirectional Long Short-Term Memory-CRF (BiLSTM-CRF) model, wherein the BiLSTM-CRF model performs slot tagging on conversation data input by a user and outputs the slot tagging result; determining reward information based on the slot tagging result and a reward of the user for the slot tagging result; and performing reinforcement learning on the BiLSTM-CRF model according to the reward information.

According to a second aspect of the embodiments of the present disclosure, a man-machine conversation device is provided, which may include: a processor; and a memory configured to store instructions executable by the processor, wherein the processor may be configured to: determine a slot tagging result output by a used BiLSTM-CRF model after slot tagging on conversation data input by a user; determine reward information based on the slot tagging result and a reward of the user for the slot tagging result; and perform reinforcement learning on the BiLSTM-CRF model according to the reward information.

According to a third aspect of the embodiments of the present disclosure, a computer-readable storage medium is provided, which has stored thereon instructions that, when executed by a processor by a man-machine conversation device, cause the device to perform a method for natural language processing, including: determining a slot tagging result output by a Bidirectional Long Short-Term Memory-CRF (BiLSTM-CRF) model, wherein the BiLSTM-CRF model performs slot tagging on conversation data input by a user and outputs the slot tagging result; determining reward information based on the slot tagging result and a reward of the user for the slot tagging result; and performing reinforcement learning on the BiLSTM-CRF model according to the reward information.

It is to be understood that the above general descriptions and detailed descriptions below are only exemplary and explanatory and not intended to limit the embodiments of the present disclosure.

BRIEF DESCRIPTION OF THE DRAWINGS

The accompanying drawings are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments of the present disclosure. Instead, they are merely examples of apparatuses and methods consistent with aspects related to the embodiments of the present disclosure as recited in the appended claims.

Terms used in the present disclosure are only adopted for the purpose of describing specific embodiments and not intended to limit the embodiments of the present disclosure. The terms "a/an" and "the" in a singular form are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms first, second, third and the like may be adopted to describe various information in the embodiments of the present disclosure, the information should not be limited to these terms. These terms are only adopted to distinguish the information of the same type. For example, without departing from the scope of the embodiments of the present disclosure, first information may also be referred to as second information and, similarly, second information may also be referred to as first information. The term "if" used here may be explained as "while" or "when" or "responsive to determining" depending on the context.

Figure 1:
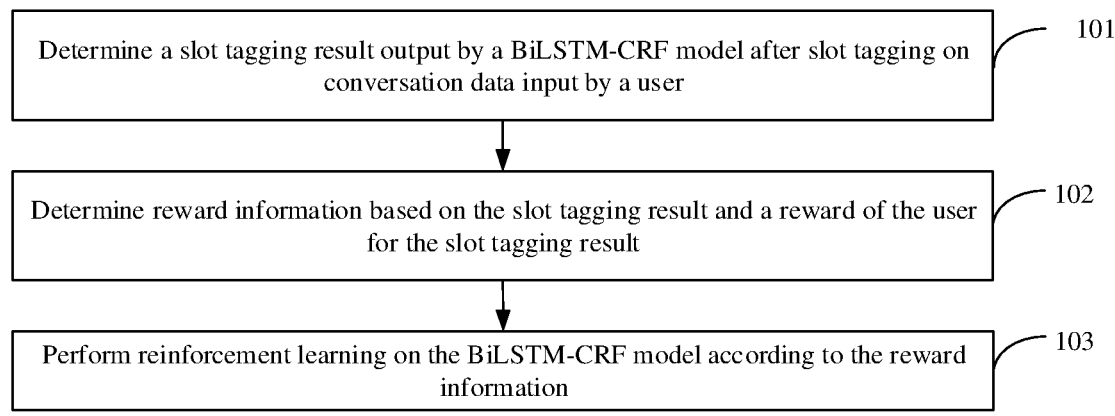
FIG. 1 is a flowchart showing a method for natural language processing, according to some embodiments of the present disclosure.

FIG. 1 is a flowchart of a method for natural language processing, according to some embodiments of the present disclosure. The method may be applied to a chatbot in a man-machine conversation device and may include the following steps.

In step 101, a slot tagging result output by a BiLSTM-CRF model after slot tagging on conversation data input by a user is determined.

In the step, the chatbot, after receiving the conversation data input by the user, may perform slot tagging on the conversation data by using the BiLSTM-CRF (Bi-directional Long Short-Term Memory-Conditional Random Field algorithm) model, and acquire the slot tagging result output by the BiLSTM-CRF model. Slot tagging may be a sequence labeling operation for solving a sequence labeling problem.

In step 102, reward information is determined based on the slot tagging result and a reward of the user for the slot tagging result.

In the step, the chatbot, after obtaining the slot tagging result, may further determine the reward information for the slot tagging result. Exemplarily, the reward information may include the reward of the user for the slot tagging result. The reward information and the reward of the user may also be referred to as the feedback information and the feedback of the user, respectively.

In step 103, reinforcement learning is performed on the BiLSTM-CRF model according to the reward information.

In the step, the chatbot may perform reinforcement learning on the BiLSTM-CRF model according to the obtained reward information for the slot tagging result, thereby implementing dynamic self-learning of the model, to reduce a manual labeling process and improve slot tagging efficiency and accuracy.

Figure 2:
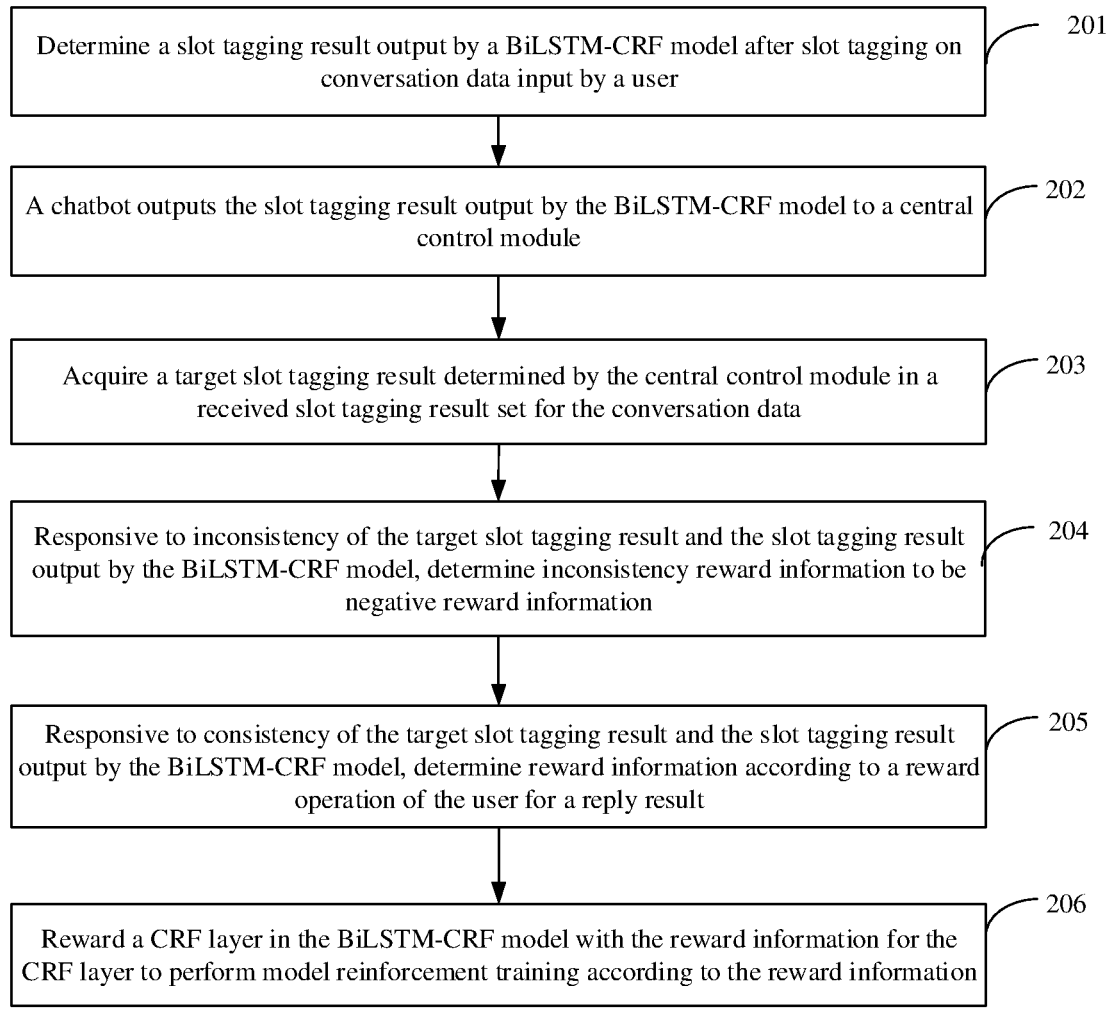
FIG. 2 is a flowchart showing a method for natural language processing, according to some embodiments of the present disclosure.

FIG. 2 is a flowchart of a method for natural language processing, according to some embodiments of the present disclosure. The method may be applied to a chatbot in a man-machine conversation device and may include the following steps.

In step 201, a slot tagging result output by a BiLSTM-CRF model after slot tagging on conversation data input by a user is determined.

Slot tagging is an important part of a Natural Language Understanding (NLU) module, the NLU module is a core part in the man-machine conversation system, and the whole NLU module may mainly include the following two functions: understanding a user intent and analyzing a core slot in a sentence expressed the user. Intent is a classifier. A type of the sentence expressed by the user is determined for further special analysis of a program (i.e., a bot (voice bot)) corresponding to the determined type. For example, when the user says "play a happy song for me," it may be determined that an intent class of the user is music, and thus a music bot may be called to recommend a song to the user for playing. If the user does not like the song, and says "change to another song," the music bot continues to serve the user and, when the user expresses another intent that is not the music, is switched to another bot to serve the user.

The man-machine conversation device further includes a central control module communicating with the NLU module. The central control module may be implemented by a central control device. When the NLU module analyses a conversation sentence to obtain more than one intent, the central control module may send the conversation sentence of the user to a bot (i.e., the chatbot) declaring that it is capable of processing the user intent, and the bot returns a processing result thereof.

The bot may need to understand a content in the conversation sentence and, for convenience, may select a core part to understand and ignore another non-core content. The core part is called a slot.

In the embodiment of the present disclosure, the chatbot may perform slot tagging on the conversation data input by the user by using the BiLSTM-CRF model. Slot tagging may be a sequence labeling operation for solving a sequence labeling problem.

A Chinese sentence is taken as an example below. A slot tagging process is implemented through the BiLSTM-CRF model as follows.

A sentence (word sequence) including n words is recorded as:

$$x=(x_1, x_2, \ldots, x_n),$$

where $x_i$ represents an Identifier (ID) of the $i^{th}$ word in the sentence in a dictionary, a one-hot vector of each word may further be obtained, and a dimension is a dictionary size.

Figure 3:
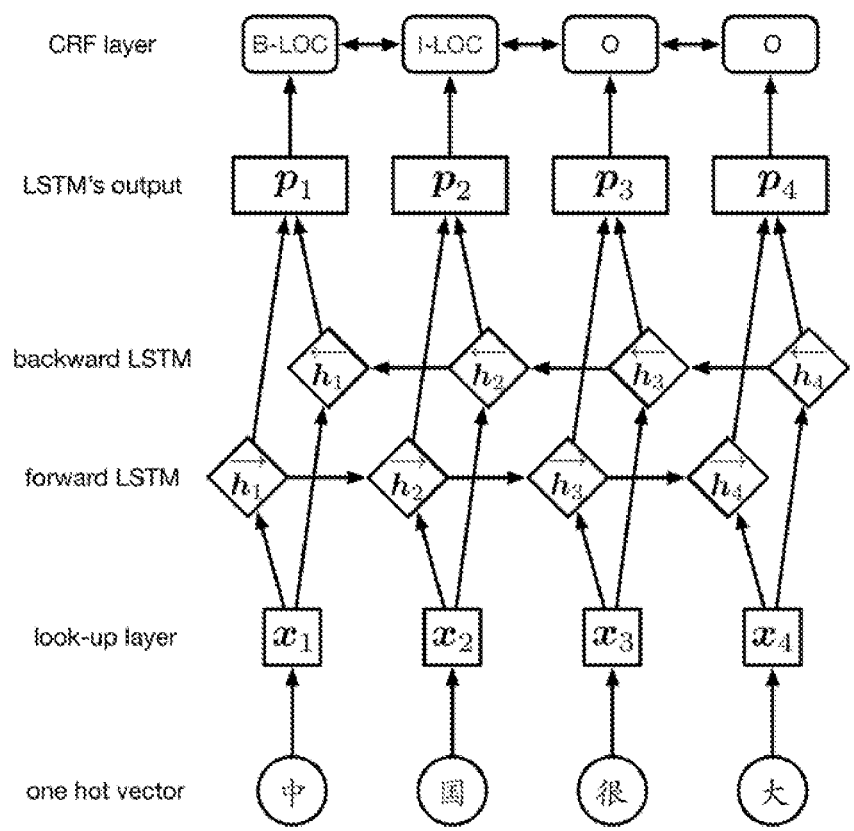
FIG. 3 is a schematic diagram illustrating a BiLSTM-CRF model, according to some embodiments of the present disclosure.

As shown in the schematic diagram illustrating a BiLSTM-CRF model in FIG. 3, a first layer of the model is a look-up layer, each word in the sentence is mapped from the one-hot vector to a low-dimensional dense word vector by use of an embedding matrix that is pre-trained or randomly initialized, and before input to a next layer, a dropout is set to alleviate over-fitting. The dropout is a method for optimizing a neural network with a deep structure, where part of weights or output of a hidden layer is randomly cleared in a learning process to reduce dependence between nodes, thereby implementing regularization of the neural network and preventing over-fitting of the neural network.

A second layer of the model is a BiLSTM layer, and includes a forward LSTM and a backward LSTM. A char embedding sequence $(x_1, x_2, \ldots, x_n)$ of all words of the sentence is taken as an input of each time step of the BiLSTM, and then a hidden state sequence of $(\overrightarrow{h_1}, \overrightarrow{h_2}, \ldots, \overrightarrow{h_n})$ output by the forward LSTM and a hidden state sequence of $(\overleftarrow{h_1}, \overleftarrow{h_2}, \ldots, \overleftarrow{h_n})$ output by the backward LSTM at respective positions are spliced according to positions, to obtain a complete hidden state sequence.

After the dropout is set, a linear layer is connected, a hidden state vector is mapped from an $m^{th}$ dimension to a $k^{th}$ dimension, k being a label number of a label set, so that an output layer (LSTM's output) outputs an automatically extracted sentence characteristic, recorded as a matrix $P=(p_1, p_2, \ldots, p_n)$.

A third layer of the model is a CRF layer for sentence-level sequence labeling. A parameter of the CRF layer is a $(k+2)*(k+2)$ matrix A. $A_{ij}$ represents a transfer score from the $i^{th}$ label to the $j^{th}$ label, and furthermore, when a position is labeled, a label that has been used for labeling may be used. 2 is added for adding a starting state to the beginning of the sentence and adding an ending state to the end of the sentence.

From FIG. 3, it may be seen that, for the Chinese sentence "中国很大" (meaning China is very large), a slot tagging result finally output by the BiLSTM-CRF model is:

| 中 | 国 | 很 | 大 |
|---|---|---|---|
| B-LOC | I-LOC | O | O |

Here, in the BIO label set, B-PER and I-PER represent a first word of a person name and a non-first word of the person name respectively, B-LOC and I-LOC represent a first word of a place name and a non-first word of the place name respectively, B-ORG and I-ORG represent a first word of an organization and a non-first word of the organization, and O represents that the word is not a part of the named entity. In a specific field, various entity types in the field may also be correspondingly customized, for example, video and weather.

In step 202, the chatbot outputs the slot tagging result output by the BiLSTM-CRF model to a central control module.

In step 203, a target slot tagging result determined by the central control module in a received slot tagging result set for the conversation data is acquired.

In the embodiment, the chatbot, after obtaining the slot tagging result output by the BiLSTM-CRF model, may output the word tagging result to the central control module. The central control module may receive slot tagging results for the same conversation data from different chatbots to form the slot tagging result set, and then the slot tagging result set may include the slot tagging result output by the BiLSTM-CRF model and a slot tagging result(s) output by the other chatbot(s).

In practice, when the NLU module analyses a conversation statement to obtain more than one intent, the central control module may determine one intent from multiple intents as a user intent, and determine at least one bot corresponding to the user intent to perform analysis processing, to obtain a processed slot tagging result set. Then, the central control module may determine the target slot tagging result matched with the user intent best in the slot tagging result set. The target slot tagging result may be output as a reply result of the man-machine conversation device for the user.

In step 204, responsive to inconsistency of the target slot tagging result and the slot tagging result output by the BiLSTM-CRF model, inconsistency reward information is determined to be negative reward information.

According to the embodiment, reward information for the slot tagging result output by the BiLSTM-CRF model may be determined in light of a comparison result of the target slot tagging result and the slot tagging result output by the BiLSTM-CRF model.

As an example, the reward information may include positive reward information and negative reward information. For example, the positive reward information may be represented by a numerical value 1, and the negative reward information may be represented by a numerical value −1.

In the step, if the slot tagging result output by the BiLSTM-CRF model is inconsistent with the target slot tagging result, the reward information may be determined to be the negative reward information.

In an embodiment, a reward calculator may be set in the chatbot to record the reward information for the present slot tagging result. For example, if the reward information is determined to be the negative reward information, a record of the reward calculator is reward=−1.

In step 205, responsive to consistency of the target slot tagging result and the slot tagging result output by the BiLSTM-CRF model, reward information is determined according to a reward operation of the user for a reply result.

In the step, if the slot tagging result output by the BiLSTM-CRF model is consistent with the target slot tagging result, the reward information may be determined in light of the reward operation of the user for the reply result.

That is, even though the slot tagging result output by the BiLSTM-CRF model is consistent with the target slot tagging result, the reward information may also be determined in light of the reward operation of the user for the reply result because the user is a real judge for whether the reply result is reasonable or not.

In an embodiment, step 205 may include the following substeps.

In S11, responsive to that a positive reward rate of the user is more than or equal to a preset threshold value, the reward information is determined to be positive reward information.

In S12, responsive to that the positive reward rate is less than the preset threshold value, the reward information is determined to be the negative reward information.

The positive reward rate is determined according to the reward operation of the user for the reply result within a time period.

In practice, multiple users may send the same or similar conversation data to the man-machine conversation device within a time bucket. Then, for the conversation data, if a slot tagging result output by the BiLSTM-CRF model is a reply result, statistics may be made to reward operations (for example, clicking or like-giving operations) of the multiple users for the reply result within the time periods. If a positive reward rate is more than or equal to the preset threshold value, it indicates that rewards of the users are positive rewards, and in such case, reward information for the slot tagging result may be determined to be positive reward information, namely reward=1. Otherwise, if the positive reward rate is less than the preset threshold value, it indicates that the rewards of the users are negative rewards, and in such case, the reward information for the slot tagging result may be determined to be negative reward information, namely reward=−1.

After the reward information is determined, the reward information may further be stored in a buffer for subsequent use.

In step 206, a CRF layer in the BiLSTM-CRF model is rewarded with the reward information for the CRF layer to perform model reinforcement training according to the reward information.

In the step, the reward calculator, after determining the reward information for the slot tagging result output by the BiLSTM-CRF model, may reward the CRF layer of the BiLSTM-CRF model with the recorded reward information, and the CRF layer performs model reinforcement learning training by taking each slot tagging result and the corresponding reward information as training data. The whole learning closed loop is completed by reinforcement learning, so that the trained BiLSTM-CRF model may obtain a more accurate slot tagging result.

In an example, four factors for reinforcement learning of the BiLSTM-CRF model may include:

Action: slot tagging result Y;

State: sequence X to be tagged;

Policy: $p(y|x)$, i.e., a probability of generating the result Y under the condition of the sequence X; and Reward: reward information/feedback information.

In the embodiment, after the slot tagging result output by the BiLSTM-CRF model is obtained, the reward information may be determined in light of rewards of the central control module and of the user for the slot tagging result to avoid troubles in labeling for the user. The reward information is returned to the CRF layer of the BiLSTM-CRF model for reinforcement learning, so that accuracy of the BiLSTM-CRF model may be improved.

The above embodiment will be exemplarily described below with a specific example.

For example, the conversation data input by the user is "tomorrow's weather." Since "tomorrow's weather" is a video title, a slot tagging result output by the BiLSTM-CRF model after slot tagging on "tomorrow's weather" is: tomorrow's weather/video. The central control module, after receiving slot tagging results sent by multiple bots, determines that a user intent of the conversation data is weather, and thus a finally obtained target slot tagging result is "tomorrow/date weather/weather." The reward calculator, after obtaining the target slot tagging result determined by the central control module, matches it and the slot tagging result output by the BiLSTM-CRF model, determines that the two are inconsistent (one is a result about the video and the other is a result about the weather), and thus sets reward information for the slot tagging result output by the BiLSTM-CRF model to be reward=−1.

On the contrary, if the central control module determines that the intent of the conversation data is video, the finally obtained target slot tagging result is "tomorrow's weather/video." The reward calculator, after obtaining the target slot tagging result determined by the central control module, matches it and the slot tagging result output by the BiLSTM-CRF model and determines that the two are consistent (both are results about the video). In such a case, the reward calculator may make statistics on a click rate of the user for a reply result (for example, a video resource, returned to the user by the central control module, of tomorrow's weather) corresponding to the target slot tagging result within a period time; if the click rate is relatively low (less than a preset threshold value), the reward calculator may consider that the reply result does not satisfy the user and may set the reward information for the slot tagging result to be reward=−1; and, on the contrary, if the click rate is relatively high (greater than the preset threshold value), the reward calculator may consider that the reply result satisfies the user and may set the reward information for the slot tagging result to be reward=1.

The reward calculator rewards the BiLSTM-CRF model with the reward information for dynamic self-learning of the model. If reward=−1, when the model receives conversation data about "tomorrow's weather" next time again, it is determined that it is not a video labeling result but a weather labeling result, and an output tagging result is "tomorrow/date weather/weather", so that a learning purpose is achieved.

Various technical features in the above embodiments may be freely combined if there are no conflicts or contradictions. Any combination of the technical features in the above embodiments shall also fall within the scope of the specification.

Corresponding to the embodiment of the method for natural language processing, the present disclosure also provides an embodiment of a natural language processing apparatus.

Figure 4:
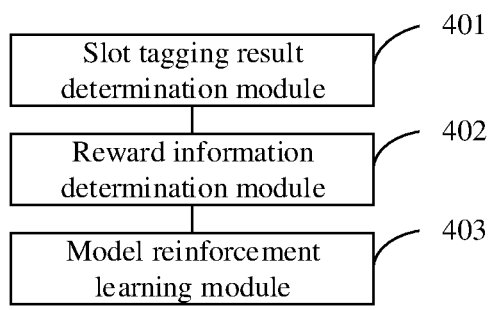
FIG. 4 is a block diagram of an apparatus for natural language processing, according to some embodiments of the present disclosure.

FIG. 4 is a block diagram of an apparatus for natural language processing, according to some embodiments of the present disclosure. The apparatus may be applied to a chatbot in a man-machine conversation system. The apparatus may include a slot tagging result determination module 401, a reward information determination module 402, and a model reinforcement learning module 403.

The slot tagging result determination module 401 is configured to determine a slot tagging result output by a BiLSTM-CRF model after slot tagging on conversation data input by a user.

The reward information determination module 402 is configured to determine reward information based on the slot tagging result and a reward of the user for the slot tagging result.

The model reinforcement learning module 403 is configured to perform reinforcement learning on the BiLSTM-CRF model according to the reward information.

According to the embodiment of the present disclosure, the slot tagging result output by the BiLSTM-CRF model is acquired through the slot tagging result determination module 401, and the reward information is determined through the reward information determination module 402 based on the slot tagging result and the reward of the user for the slot tagging result, so that a manual labeling workload is reduced. Then, reinforcement learning is performed on the BiLSTM-CRF model through the model reinforcement learning module 403 according to the reward information to implement dynamic self-learning of the model, so that slot tagging accuracy of the model may be improved.

In an embodiment, the man-machine conversation device further includes a central control module, and the apparatus further includes a slot tagging result output module and a target slot tagging result determination module.

The slot tagging result output module is configured to output the slot tagging result output by the BiLSTM-CRF model to the central control module.

The target slot tagging result determination module is configured to acquire a target slot tagging result determined by the central control module from a received slot tagging result set for the conversation data.

Here, the slot tagging result set includes the slot tagging result output by the BiLSTM-CRF model and slot tagging result(s) output by other chatbot(s), and the target slot tagging result is output as a reply result of the man-machine conversation device for the user.

In another embodiment, the reward information determination module 402 may include a first reward information determination submodule and a second reward information determination submodule.

The first reward information determination submodule is configured to, responsive to inconsistency of the target slot tagging result and the slot tagging result output by the BiLSTM-CRF model, determine the inconsistency reward information to be negative reward information.

The second reward information determination submodule is configured to, responsive to consistency of the target slot tagging result and the slot tagging result output by the BiLSTM-CRF model, determine the reward information according to a reward operation of the user for the reply result.

It may be seen from the embodiment that, the reward information may include reward information of the central processing module and the reward information of the user, so that reward information determination dimensions are enriched, and labeling accuracy is improved.

In an embodiment, the second reward information determination submodule is configured to:

responsive to that a positive reward rate of the user is more than or equal to a preset threshold value, determine the reward information to be positive reward information; and responsive to that the positive reward rate is less than the preset threshold value, determine the reward information to be the negative reward information, the positive reward rate being determined according to the reward operation of the user for the reply result within a time period.

In the embodiment, during labeling of the reward information, analysis may be performed in light of the reward information of the central control module and the user, so that labeling accuracy may be improved.

In an embodiment, the model reinforcement learning module 403 is configured to:

reward a CRF layer in the BiLSTM-CRF model with the reward information for the CRF layer, to perform model reinforcement training according to the reward information.

In the embodiment, model reinforcement learning is performed through the model reinforcement learning module 403 according to the reward information, so that dynamic self-learning of the model may be implemented, and slot tagging accuracy of the model may be improved.

The apparatus embodiment substantially corresponds to the method embodiment, and thus related parts refer to part of descriptions of the method embodiment. The apparatus embodiment described above is only exemplary, modules described as separate parts therein may or may not be physically separated, and may be located in the same place or may also be distributed to multiple networks. Part or all of the modules therein may be selected according to a practical requirement to achieve the purpose of the solution of the embodiment of the present disclosure. Those of ordinary skill in the art may understand and implement without creative work.

Figure 5:
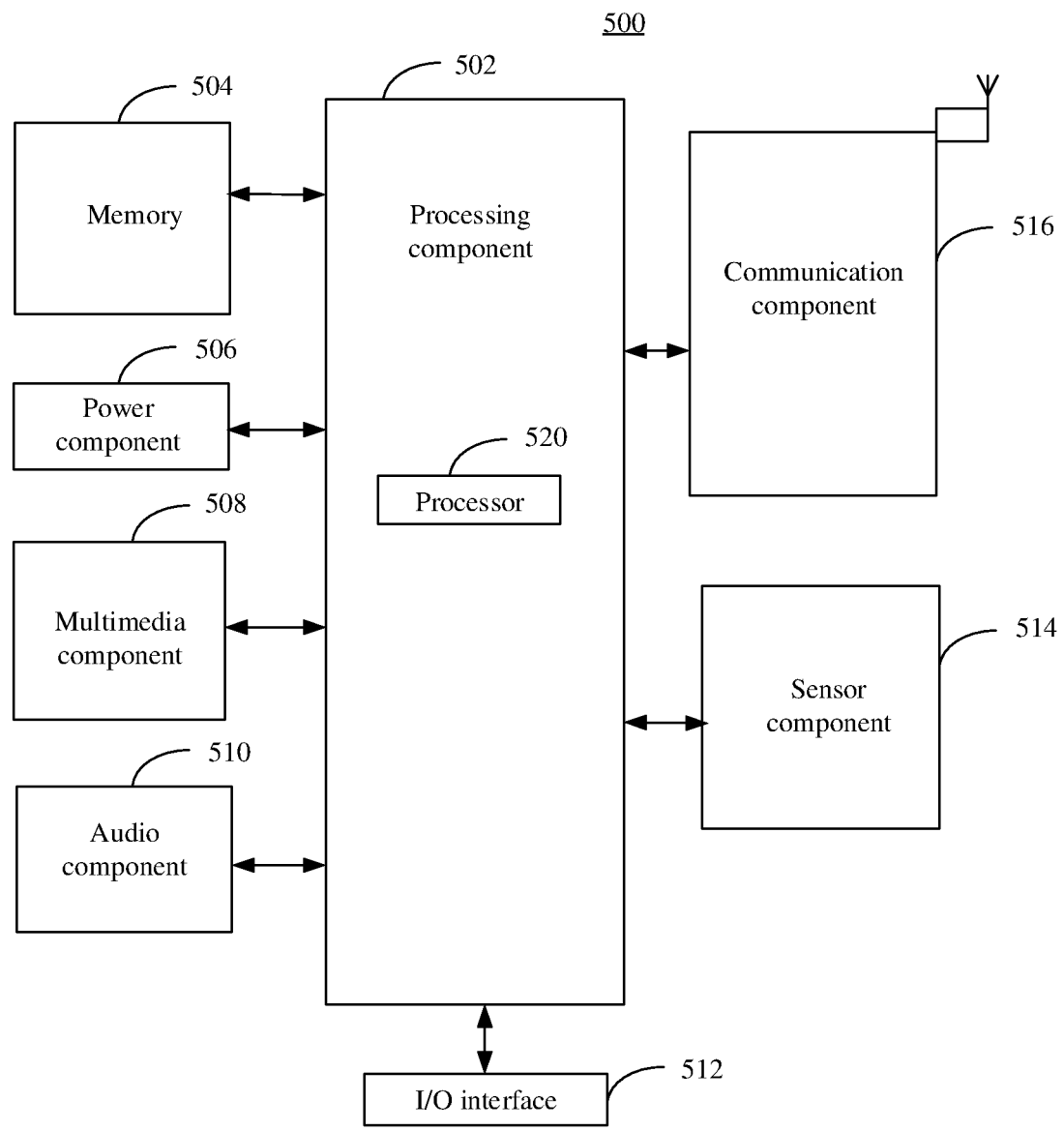
FIG. 5 is a block diagram of a man-machine interaction device, according to some embodiments of the present disclosure.

FIG. 5 is a block diagram of a man-machine conversation device 500, according to some embodiments of the present disclosure.

Referring to FIG. 5, the device 500 may include one or more of the following components: a processing component 502, a memory 504, a power component 506, a multimedia component 508, an audio component 510, an Input/Output (I/O) interface 512, a sensor component 514, and a communication component 516.

The processing component 502 usually controls overall operations of the device 500. The processing component 502 may include one or more processors 520 to execute instructions to perform all or part of the steps in the method. Moreover, the processing component 502 may include one or more modules which facilitate interaction between the processing component 502 and the other components. For instance, the processing component 502 may include a multimedia module to facilitate interaction between the multimedia component 508 and the processing component 502.

The memory 504 is configured to store various types of data to support the operation of the device 500. Examples of such data include instructions for any application programs or methods operated on the device 500. The memory 504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 provides power for various components of the device 500. The power component 506 may include a power management system, one or more power supplies, and other components associated with generation, management and distribution of power for the device 500.

The multimedia component 508 includes a screen providing an output interface between the device 500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. The audio component 510 is configured to output and/or input an audio signal. For example, the audio component 510 includes a Microphone (MIC), and the MIC is configured to receive an external audio signal when the device 500 is in the operation mode, such as a call mode, a recording mode and a voice recognition mode. The received audio signal may further be stored in the memory 504 or sent through the communication component 516. In some embodiments, the audio component 510 further includes a speaker configured to output the audio signal.

The I/O interface 512 provides an interface between the processing component 502 and a peripheral interface module, and the peripheral interface module may be a keyboard, a click wheel, a button and the like. The button may include, but not limited to: a home button, a volume button, a starting button and a locking button.

The sensor component 514 includes one or more sensors configured to provide status assessment in various aspects for the device 500. For instance, the sensor component 514 may detect an on/off status of the device 500 and relative positioning of components, such as a display and small keyboard of the device 500, and the sensor component 514 may further detect a change in a position of the device 500 or a component of the device 500, presence or absence of contact between the user and the device 500, orientation or acceleration/deceleration of the device 500 and a change in temperature of the device 500. The sensor component 514 may include a proximity sensor configured to detect presence of an object nearby without any physical contact. The sensor component 514 may also include a light sensor, such as a Complementary Metal Oxide Semiconductor (CMOS) or Charge Coupled Device (CCD) image sensor, configured for use in an imaging application. In some embodiments, the sensor component 514 may also include an acceleration sensor, a gyroscope sensor, a magnetic sensor, a pressure sensor or a temperature sensor.

The communication component 516 is configured to facilitate wired or wireless communication between the device 500 and another device. The device 500 may access a communication-standard-based wireless network, such as a Wireless Fidelity (WiFi) network, a 4th-Generation (4G) or 5th-Generation (5G) network or a combination thereof. In some embodiments, the communication component 516 receives a broadcast signal or broadcast associated information from an external broadcast management system through a broadcast channel. In some embodiments, the communication component 516 further includes a Near Field Communication (NFC) module to facilitate short-range communication. In some embodiments, the communication component 516 may be implemented based on a Radio Frequency Identification (RFID) technology, an Infrared Data Association (IrDA) technology, an Ultra-WideBand (UWB) technology, a Bluetooth (BT) technology and another technology.

In some embodiments, the device 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium including instructions, such as the memory 504 including an instruction, and the instruction may be executed by the processor 520 of the device 500 to implement the abovementioned method. For example, the non-transitory computer-readable storage medium may be a ROM, a Compact Disc Read-Only Memory (CD-ROM), a magnetic tape, a floppy disc, an optical data storage device and the like.

The instructions in the storage medium is executed by the processor to cause the device 500 to perform a method for natural language processing, the method including: a slot tagging result output by a BiLSTM-CRF model after slot tagging on conversation data input by a user is determined; reward information is determined based on the slot tagging result and a reward of the user for the slot tagging result; and reinforcement learning is performed on the BiLSTM-CRF model according to the reward information.

Other implementation solutions of the present disclosure will be apparent to those skilled in the art from consideration of the specification and practice of the embodiments of the present disclosure. The embodiments of the present disclosure are intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes may be made without departing from the scope thereof. It is intended that the scope of the embodiments of the present disclosure only be limited by the appended claims.

In the embodiments of the present disclosure, the BiLSTM-CRF model is taken as a basic framework, and after the BiLSTM-CRF model externally outputs the slot tagging result, the chatbot may acquire the corresponding reward information according to the slot tagging result, and perform reinforcement learning on the BiLSTM-CRF model according to the reward information, thereby implementing dynamic self-learning of the model, to reduce a manual labeling process and improve slot tagging efficiency and accuracy.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for natural language processing, executed by a chatbot in a man-machine conversation device comprising a central control device, the method comprising:

determining a slot tagging result output by a Bi-directional Long Short-Term Memory-Conditional Random Field algorithm (BiLSTM-CRF) model, wherein the BiLSTM-CRF model performs slot tagging on conversation data input by a user and outputs the slot tagging result;

outputting, by the chatbot, the slot tagging result output by the BiLSTM-CRF model to the central control device;

acquiring a target slot tagging result determined by the central control device from a received slot tagging result set for the conversation data, wherein the slot tagging result set comprises the slot tagging result output by the BiLSTM-CRF model and one or more slot tagging results output by one or more other chatbots, and the target slot tagging result is output as a reply result of the man-machine conversation device for the user;

determining reward information by:
  responsive to inconsistency of the target slot tagging result and the slot tagging result output by the BiLSTM-CRF model, determining inconsistency reward information to be negative reward information; or
  responsive to consistency of the target slot tagging result and the slot tagging result output by the BiLSTM-CRF model, determining the reward information according to a reward operation of the user for the reply result; and performing reinforcement learning on the BiLSTM-CRF model according to the reward information.

2. The method of claim 1, wherein determining the reward information according to the reward operation of the user for the reply result comprises one of:

responsive to that a positive reward rate of the user is more than or equal to a preset threshold value, determining the reward information to be positive reward information; or responsive to that the positive reward rate is less than the preset threshold value, determining the reward information to be the negative reward information, wherein the positive reward rate is determined according to the reward operation of the user for the reply result within a time period.

3. The method of claim 1, wherein performing model reinforcement learning according to the reward information comprises:

providing a CRF layer in the BiLSTM-CRF model with the reward information, to perform model reinforcement training according to the reward information.

4. A man-machine conversation device that comprises a chatbot and a central control device, the man-machine conversation device comprising:

a processor; and a memory configured to store instructions executable by the processor, wherein the processor is configured to:

determine a slot tagging result output by a Bi-directional Long Short-Term Memory-Conditional Random Field algorithm (BiLSTM-CRF) model, wherein the BiLSTM-CRF model performs slot tagging on conversation data input by a user and outputs the slot tagging result;

output the slot tagging result output by the BiLSTM-CRF model to the central control device;

acquire a target slot tagging result determined by the central control device in a received slot tagging result set for the conversation data, wherein the slot tagging result set comprises the slot tagging result output by the BiLSTM-CRF model and one or more slot tagging results output by one or more other chatbots, and the target slot tagging result is output as a reply result of the man-machine conversation device for the user;

determine reward information by:
- responsive to inconsistency of the target slot tagging result and the slot tagging result output by the BiLSTM-CRF model, determining inconsistency reward information to be negative reward information; or
- responsive to consistency of the target slot tagging result and the slot tagging result output by the BiLSTM-CRF model, determining the reward information according to a reward operation of the user for the reply result; and
- perform reinforcement learning on the BiLSTM-CRF model according to the reward information.

5. The man-machine conversation device of claim 4, wherein the processor is configured to:
- responsive to that a positive reward rate of the user is more than or equal to a preset threshold value, determine the reward information to be positive reward information; and
- responsive to that the positive reward rate is less than the preset threshold value, determine the reward information to be the negative reward information,
- wherein the positive reward rate is determined according to the reward operation of the user for the reply result within a time period.

6. The man-machine conversation device of claim 4, wherein the processor is further configured to:
- provide a CRF layer in the BiLSTM-CRF model with the reward information, for the CRF layer to perform model reinforcement training according to the reward information.

7. A non-transitory computer-readable storage medium having stored therein instructions that, when executed by a processor of a man-machine conversation device comprising a chatbot and a central control device, cause the man-machine conversation device to perform a method comprising:
- determining a slot tagging result output by a Bi-directional Long Short-Term Memory-Conditional Random Field algorithm (BiLSTM-CRF) model, wherein the BiLSTM-CRF model performs slot tagging on conversation data input by a user and outputs the slot tagging result;
- outputting, by the chatbot, the slot tagging result output by the BiLSTM-CRF model to the central control device;
- acquiring a target slot tagging result determined by the central control device from a received slot tagging result set for the conversation data, wherein the slot tagging result set comprises the slot tagging result output by the BiLSTM-CRF model and one or more slot tagging results output by one or more other chatbots, and the target slot tagging result is output as a reply result of the man-machine conversation device for the user;
- determining reward information by:
  - responsive to inconsistency of the target slot tagging result and the slot tagging result output by the BiLSTM-CRF model, determining inconsistency reward information to be negative reward information; or
  - responsive to consistency of the target slot tagging result and the slot tagging result output by the BiLSTM-CRF model, determining the reward information according to a reward operation of the user for the reply result; and
- performing reinforcement learning on the BiLSTM-CRF model according to the reward information.

8. The non-transitory computer-readable storage medium of claim 7, wherein determining the reward information according to the reward operation of the user for the reply result comprises one of:
- responsive to that a positive reward rate of the user is more than or equal to a preset threshold value, determining the reward information to be positive reward information; or
- responsive to that the positive reward rate is less than the preset threshold value, determining the reward information to be the negative reward information,
- wherein the positive reward rate is determined according to the reward operation of the user for the reply result within a time period.

9. The non-transitory computer-readable storage medium of claim 7, wherein performing model reinforcement learning according to the reward information comprises:
- providing a CRF layer in the BiLSTM-CRF model with the reward information, to perform model reinforcement training according to the reward information.

* * * * *